May 27, 1930.  G. E. NERNEY ET AL  1,759,863
EYEGLASS CONSTRUCTION
Filed Jan. 6, 1927
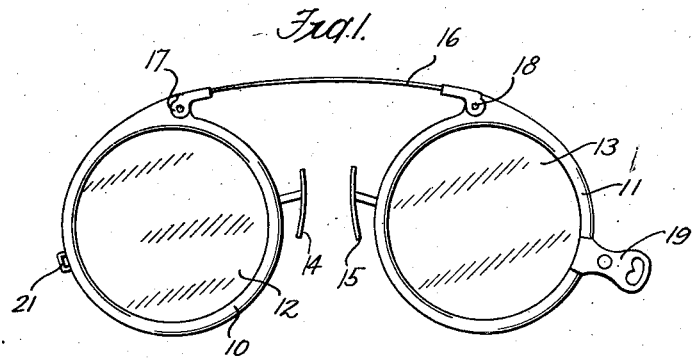
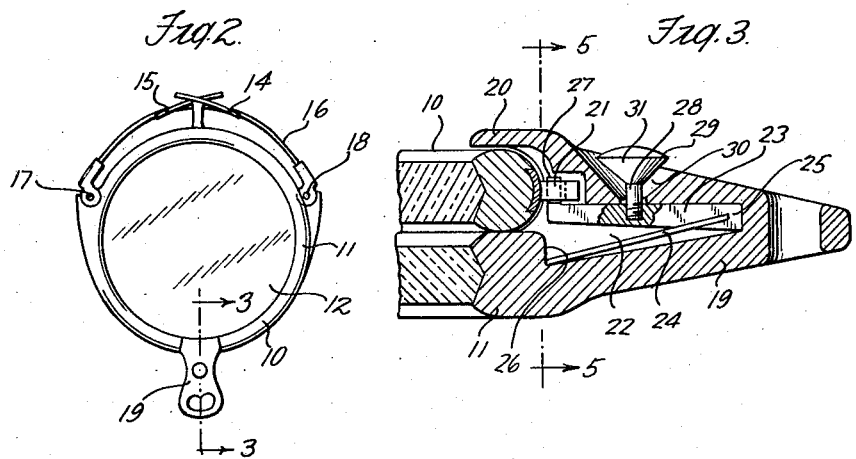
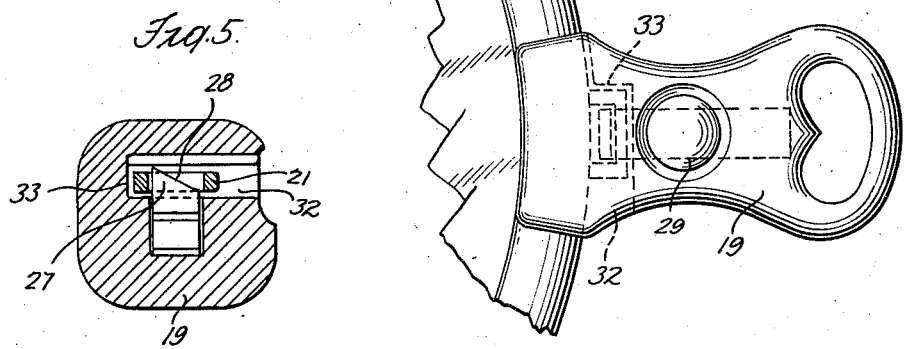
George E. Nerney
Wilbur H. Liddall  INVENTORS
BY
Robert S. Blair  ATTORNEY Patented May 27, 1930

1,759,863

UNITED STATES PATENT OFFICE

GEORGE E. NERNEY AND WILBUR H. SIDDALL, OF ATTLEBORO, MASSACHUSETTS, ASSIGNORS TO BAY STATE OPTICAL COMPANY, OF ATTLEBORO, MASSACHUSETTS, A CORPORATION OF MAINE

EYEGLASS CONSTRUCTION

Application filed January 6, 1927. Serial No. 159,314.

This invention relates to eyeglass construction and more particularly to eyeglass frames which are capable of being folded, such as folding oxford frames or the like.

One of the objects of the invention is to provide a construction of the above nature which is practical and highly efficient. Another object is to provide an eyeglass frame of folding type having highly satisfactory means for holding the frame folded. Another object is to provide a catch for a folding frame which is dependable in action and convenient to operate for folding and unfolding the frame. Another object is to provide a construction of this nature which is simple and inexpensive to make and convenient to assemble. Another object is to provide a construction of the above nature having no features to detract from the ornamental appearance of the frame. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 shows a pair of eyeglasses of the folding oxford type, in unfolded position;

Figure 2 shows the eyeglasses of Figure 1 in folded position;

Figure 3 is a section taken along the line 3—3 of Figure 2 and showing the parts in enlarged detail;

Figure 4 is a top plan view of Figure 3, and

Figure 5 is a section taken along the line 5—5 of Figure 3.

Similar reference characters refer to similar parts throughout the several views of the drawing.

Referring now to the drawing in detail, there is shown a pair of eyeglasses of the oxford type having rims 10 and 11 within which are carried the lenses 12 and 13. The rims 10 and 11 shown herein are of non-metallic material such as celluloid or shell, but it is to be understood that the features of this invention are not limited to any particular type of frame. The rims are shown provided with nose pieces 14 and 15 and are connected by a bridge member 16 which takes the form of a flat strip of spring metal. This bridge is connected to the respective rims preferably by pivotal connections 17 and 18, these parts being not shown in detail herein since, in themselves, they form no part of the present invention. Ordinarily there are associated with the pivotal connections 17 and 18 suitable spring means which tend to hold the parts in the extended or unfolded position shown in Figure 1. The spring bridge 16 tends to assume the shape shown in Figure 1 and, as will be understood, it serves to urge the rims toward each other when the eyeglasses are in position upon the wearer, holding the nose pieces 14 and 15 in against the sides of the nose.

The spring bridge 16 and its end connections with the rims are such that the eyeglass frame is capable of being folded into the position shown in Figure 2, that is with the rims positioned one over the other and with the lenses face to face. When the frame is thus folded the spring bridge 16 and the springs embodied in its pivotal connections 17 and 18 continually urge the parts to spring back to the unfolded position shown in Figure 1.

One of the rims, preferably the right-hand rim 11, is provided with a part 19 which projects outwardly therefrom in a substantially radial direction and which serves as a suitable handle or finger grip. This handle 19, as shown in Figure 3, is preferably formed integrally with the rim 11 and is in this instance of non-metallic material corresponding with the material of the rims. The handle is provided with a portion 20 which overhangs the rim 11 and beneath which the rim 10 slides when the eyeglass frame is folded. This portion 20 guides the rims into properly folded position and prevents their being sprung apart after being folded.

On the portion of the rim 10 which comes beneath the part 20 of the handle when the eyeglasses are folded, is a projecting part 21. This part 21 is adapted to coact with a catch mechanism which is positioned within the handle 19, as will be described presently. The part 21 is preferably of metal and may be secured to the rim in any desired manner. This part 21, as clearly shown in Figure 1, forms an eye or a closed loop which is adapted to receive a part of the catch to hold the eyeglass frame folded against the action of the spring means embodied in the bridge 16 and tending to unfold the frame.

Referring now to Figure 3, there is formed in the handle member 19 a recess 22 extending thereinto in a substantially radial direction from the inner end thereof, that is, the open mouth of this recess is adjacent to the rim 11. In this recess is positioned the catch mechanism for cooperating with the eye 21. This catch comprises a member 23 which is of metal and preferably substantially rigid, and a member 24 which is preferably of spring steel in the shape of a leaf spring. These two members 23 and 24, it will be seen, form a substantially V-shaped device, one side of which is adapted to be moved toward the other for releasing the catch. The member 23 extends from adjacent the mouth of the recess 22 to the outer end 25 thereof and the width of the recess, as viewed in Figure 4, is preferably sufficient to just accommodate the member 23. As viewed in Figure 3, the recess 22 at its end adjacent the mouth thereof is greater than its width at the end 25, a shoulder 26 being formed adjacent the mouth.

The outer end of the member 23, that is, the end thereof at the end 25 of the recess, is held in position by the walls of the recess. The spring 24 normally holds the member 23 upwardly against the upper wall of the recess, as viewed in Figure 3. The inner end of the member 23 may be moved downwardly against the action of the spring 24 or in a direction substantially axially of the eyeglass rims, the member 23 pivoting about its fixed end 25 to permit this movement. The leaf spring 24 is secured to the member 23 adjacent its outer end preferably by being clamped in an inclined slot formed in the member 23 as shown. The other end of the leaf spring bears against the shoulder 26.

On the inner end portion of the member 23 is formed an upwardly projecting lug 27 which takes into the eye 21. This lug 27 is provided with a beveled surface 28, as shown in Figure 15, so that when the eyeglass frame is folded and the eye 21 strikes the surface 28, the lug 27 is depressed against the action of the spring 24; as soon as the opening of the eye moves into registry with the lug 27 the lug snaps into the eye and the folded frame is locked against unfolding. In order to release the catch and permit the frame to snap into unfolded position, it is necessary to depress the member 23, that is, to swing the member 23 downwardly about its fixed end 25.

As shown in Figure 3, there is threaded into the member 23 adjacent its inner end a screw consisting of a threaded shank 28 and an enlarged head 29. The shank 28 projects outwardly through an opening 30 in the handle member 19 to the outer surface of the handle and the head 29 is adapted to be depressed by the thumb to move the member 23 downwardly and release the catch. The head 29 is joined to the shank 28 by a taper 31 and the opening 30 is correspondingly tapered. In this manner, sufficient clearance is allowed for movement of the head or button 29 to release the catch without requiring that the head or button project any substantial distance from the handle member; also, the mating tapers of the head and of the opening automatically center the head or button when it is depressed.

It will be seen that this construction is extremely advantageous. The catch is released to unfold the eye-glass frame with the greatest convenience by a simple downward pressure of the thumb upon the button 29. The construction is simple and embodies no parts which are liable to become disarranged or out of order. Only a comparatively small recess is required to receive the member 23 and its spring 24, and no parts are exposed except for the operating button 29.

In assembling the construction the member 23 with its spring 24 is simply slipped into the open mouth of the recess until the end of the spring 24 snaps into place in back of the shoulder 26. The parts are then automatically locked in position and no further operations are required except to thread the shank 28 into the member 23. The lug 27 resting in the eye 21, and the part 20 resting over the rim 10, hold the rims from moving apart in any direction. As shown in Figures 4 and 5, there is provided a passage 32 in the inner end of the handle member 19 through which the eye 21 moves to engage the lug 27. The part 33 forms a stop which limits the movement of the rims in folding and prevents movement of the eye 21 beyond proper position for engagement by the lug 27.

As many possible embodiments may be made of the above invention and as many changes might be made in the embodiment above set forth, it is to be understood that all matter hereinbefore set forth or shown in the accompanying drawing, is to be interpreted as illustrative and not in a limiting sense.

We claim as our invention:

1. In eyeglass construction, a folding frame comprising, in combination, a pair of rims, means connecting said rims adapted to permit them to swing together into folded position one over the other and including spring means tending to unfold them, and means adapted to hold said rims in folded position against the action of said spring means, said last means including means forming a closed loop on one of said rims and a spring catch on the other of said rims having a part adapted to enter said loop.

2. In eyeglass construction, a folding frame comprising, in combination, a pair of rims, means connecting said rims adapted to permit them to swing together into folded position one over the other and including spring means tending to unfold them, and means adapted to hold said rims in folded position against the action of said spring means, said last means including a spring catch on one of said rims and means on the other of said rims adapted to be engaged by said catch, said catch comprising a substantially V-shaped device one side of which carries the operative catch part and is adapted to be moved toward the other for releasing the catch.

3. In eyeglass construction, a folding frame comprising, in combination, a pair of rims, means connecting said rims adapted to permit them to swing together into folded position one over the other and including spring means tending to unfold them, and means adapted to hold said rims in folded position against the action of said spring means, said last means including a spring catch on one of said rims and means on the other of said rims adapted to be engaged by said catch, said catch comprising a substantially rigid member having at one end a part adapted to engage said means on the other rim, and a leaf spring positively connected to said member adjacent the other end thereof and extending substantially lengthwise thereof and urging said member into operative position.

4. In eyeglass construction, a folding eyeglass frame comprising, in combination, a pair of rims adapted to swing together into folded position one over the other, a projecting part on one of said rims adapted to serve as a handle member, and means for holding said rims in said folded position comprising a catch mounted upon said handle member and means upon the other rim adapted to be engaged by said catch, said catch being inserted in a substantially radially extending recess in said handle member and comprising a metal member the outer end of which is held in position by the walls of said recess and the inner end of which has a part adapted to coact with said means on the other rim and is adapted to swing about said outer end to move said part into and out of operative position.

5. In eyeglass construction, a folding eyeglass frame comprising, in combination, a pair of rims adapted to swing together into folded position one over the other, a projecting part on one of said rims adapted to serve as a handle member, and means for holding said rims in said folded position comprising a catch mounted upon said handle member and means upon the other rim adapted to be engaged by said catch, said catch being inserted in a substantially radially extending recess in said handle member and comprising a metal member the outer end of which is held in position by the walls of said recess and the inner end of which has a part adapted to coact with said means on the other rim and is adapted to swing about said outer end to move said part into and out of operative position, and a part connected to said metal member and extending therefrom through said handle member to the outer surface thereof and adapted to be manipulated to swing said member.

6. In eyeglass construction, a folding eyeglass frame comprising, in combination, a pair of rims adapted to swing together into folded position one over the other, a projecting part on one of said rims adapted to serve as a handle member, and means for holding said rims in said folded position comprising a catch mounted upon said handle member and means upon the other rim adapted to be engaged by said catch, said catch being inserted in a substantially radially extending recess in said handle member and comprising a metal member the outer end of which is held in position by the walls of said recess and the inner end of which has a part adapted to coact with said means on the other rim and is adapted to swing about said outer end to move said part into and out of operative position, and means yieldingly holding said inner end of said member so that said part thereof is in operative position.

7. In eyeglass construction, a folding eyeglass frame comprising, in combination, a pair of rims adapted to swing together into folded position one over the other, a projecting part on one of said rims adapted to serve as a handle member, and means for holding said rims in said folded position comprising a catch mounted upon said handle member and means upon the other rim adapted to be engaged by said catch, said catch being inserted in a substantially radially extending recess in said handle member and comprising a metal member the outer end of which is held in position by the walls of said recess and the inner end of which has a part adapted to coact with said means on the other rim and is adapted to swing about said outer end to move said part into and out of operative position, and a leaf spring connected to said member adjacent the outer end thereof and bearing against a wall of said recess and holding said member so that said part thereof is in operative position.

8. In eyeglass construction, a folding eyeglass frame comprising, in combination, a pair of rims adapted to swing together into folded position one over the other, a projecting part on one of said rims adapted to serve as a handle member, and means for holding said rims in said folded position comprising a catch mounted upon said handle member and means upon the other rim adapted to be engaged by said catch, said catch being inserted in a substantially radially extending recess in said handle member and comprising a metal member the outer end of which is held in position by the walls of said recess and the inner end of which has a part adapted to coact with said means on the other rim and is adapted to swing about said outer end to move said part into and out of operative position, and means yieldingly holding said inner end of said member so that said part thereof is in operative position, and a screw threaded into said member and extending therefrom to the outer surface of said handle member, said screw having an enlarged head adapted to be depressed to move said member to inoperative position against the action of said yielding means.

9. In a folding eyeglass frame, in combination, a pair of rims adapted to swing together into folded position one over the other, a substantially radially projecting part on one of said rims adapted to serve as a handle member, a catch receiving part on the other of said rims which is positioned adjacent said handle when the rims are folded, a recess extending into said handle member in a substantially radial direction from the inner end thereof, a member in said recess and movable therein in a direction substantially at right angles to said radial direction, said member comprising a catch member normally resting against the wall of said recess and adapted to coact with said part on the other rim to hold the eyeglass frame folded, a spring interposed between said member and another wall of said recess and holding said catch in said operative position, and means extending outwardly through said first wall for moving said member against the action of said spring to release said catch.

10. In a folding eyeglass frame, in combination, a pair of rims adapted to swing together into folded position one over the other, a substantially radially projecting part on one of said rims adapted to serve as a handle member, a catch receiving part on the other of said rims which is positioned adjacent said handle when the rims are folded, a recess extending into said handle member in a substantially radial direction from the inner end thereof, a member in said recess and movable therein in a direction substantially at right angles to said radial direction, said member comprising a catch adapted to coact with said part on the other rim to hold the eyeglass frame folded, a spring interposed between said member and a wall of said recess and holding said catch in operative position, and means for moving said member against the action of said spring to release said catch, said spring being positively secured to said member and disposed to engage a shoulder formed within said recess in such manner as to prevent withdrawal of said catch from said recess.

11. In eyeglass construction, a catch for a folding eyeglass frame having a handle member comprising, in combination, a spring pressed catch mounted upon the handle member and means upon the frame adapted to coact with said catch to hold the frame folded, said catch being inserted in a recess in said handle member, and a part for releasing said catch comprising a shank portion extending through an opening in a wall of said handle member and having an enlarged head adapted to be depressed to release said catch, the under side of said head tapering to the diameter of said shank and said opening in the handle member being correspondingly tapered.

12. In eyeglass construction, a catch for a folding eyeglass frame having a handle member comprising, in combination, a leaf spring inserted in a recess extending radially into said handle member from its inner end, a catch member urged into operative position by said leaf spring, means upon the frame to coact with said catch member to hold the frame folded, said recess being substantially closed by the walls of said handle member at the sides and outer end thereof, and means projecting through one of the walls of said handle member for distorting said spring to move said catch member to inoperative position.

13. In eyeglass construction, a folding frame comprising, in combination, a pair of rims, means connecting said rims adapted to permit them to swing together into folded position one over the other and including spring means tending to unfold them, a handle member projecting outwardly from one of said rims, a catch member mounted on said handle having an offset a projecting part beveled at the end and movable substantially transversely of said handle into and out of operative position, and means projecting outwardly from the other rim adapted to coact with said beveled end to force said projecting part aside and permit the interlocking of said means and said projecting part to hold said frame folded.

14. In eyeglass construction, a folding frame comprising, in combination, a pair of rims, means connecting said rims adapted to permit them to swing together into folded position one over the other and including spring means tending to unfold them, a handle member projecting outwardly from one of said rims having therein a recess opening at the inner end of said handle member, a wall of said recess having a shoulder adjacent said mouth, a member positioned in said recess and extending lengthwise thereof and having adjacent the mouth thereof a catch part, a leaf spring extending lengthwise of said recess bearing at one end against said shoulder and connected at its other end to said member, said leaf spring urging said member against the wall of said recess opposite said first wall thereof, means upon the other rim adapted to enter into engagement with said catch part of said member to hold said rims in folded position, and means projecting from said member outwardly through a wall of said handle for moving said member against the action of said spring to disengage said catch.

15. In eyeglass construction, the combination with a folding eyeglass frame having a longitudinally recessed handle member provided with an interior abutment adjacent the mouth of said recess, of a spring-pressed catch mounted within said recess and provided with means adapted to engage an inner surface of said abutment to retain said catch member within said handle member.

16. In eyeglass construction, the combination with a folding eyeglass frame having a recessed handle member upon one rim thereof, provided with an interior abutment adjacent the mouth of said recess, and means carried by the other rim of said frame adapted to be brought into operative relation with said handle to engage a catch thereon; of a catch comprising a movable member and a leaf spring for urging said member into operative position, said member and said leaf spring being mounted within said recess, with an end of said leaf spring sprung into engagement with a surface of said abutment, to retain said catch within said handle member.

17. In a folding eyeglass frame, in combination, a pair of rims adapted to swing together into folded position one over the other, a substantially radially projecting part on one of said rims adapted to serve as a handle member, a catch receiving part on the other of said rims which is positioned adjacent said handle when the rims are folded, a recess having substantially continuous lateral walls extending into said handle member in a substantially radial direction from the inner end thereof, where an opening into said recess is formed, a spring catch within said recess adapted to coact with said part on said other rim to hold said eyeglass frame folded, and means removably secured to a portion of said catch and projecting through said handle member for releasing said catch, said catch being formed of a rigid portion and a resilient portion joined together at an end of each and normally spread apart at their respective opposite ends, said catch being capable of insertion joined end first through said opening into said recess.

In testimony whereof, we have signed our names to this specification this 13th day of December, 1926.

GEORGE E. NERNEY.
WILBUR H. SIDDALL.